United States Patent [19]

Smith, Jr.

[11] Patent Number: 4,698,499

[45] Date of Patent: Oct. 6, 1987

[54] QUANTITATIVE EVALUATION OF URANIUM ORE ZONES

[75] Inventor: Harry D. Smith, Jr., Houston, Tex.

[73] Assignee: Halliburton Company, Duncan, Okla.

[21] Appl. No.: 832,181

[22] Filed: Feb. 24, 1986

Related U.S. Application Data

[63] Continuation of Ser. No. 562,875, Dec. 19, 1983, abandoned.

[51] Int. Cl.⁴ .................................................. G01V 5/00
[52] U.S. Cl. ..................................... 250/256; 250/262
[58] Field of Search ...................... 250/250, 262, 269

[56] References Cited

U.S. PATENT DOCUMENTS

| | | | |
|---|---|---|---|
| 4,349,736 | 9/1982 | Miller | 250/252.1 |
| 4,459,479 | 7/1984 | Smith, Jr. et al. | 250/256 |
| 4,492,863 | 1/1985 | Smith, Jr. | 250/256 |

Primary Examiner—Carolyn E. Fields
Assistant Examiner—Richard Hanig
Attorney, Agent, or Firm—William J. Beard

[57] ABSTRACT

Uranium ore zones are quantitatively evaluated using the relative photoelectric absorption of naturally occurring gamma rays in two energy bands. One band experiences significant photoelectric absorption from uranium; the other does not. The ratio of the resultant measurements provides a quantitative indication of the uranium concentration.

3 Claims, 3 Drawing Figures

NATURAL GAMMA RAY SPECTRUM

QUANTITATIVE EVALUATION OF URANIUM ORE ZONES

This application is a continuation of Ser. No. 562,875 filed Dec. 19, 1983 now abandon.

BACKGROUND OF THE INVENTION

The present invention relates to methods and apparatus for logging earth formations penetrated by a borehole, and more particularly to methods and apparatus for directly determining formation characteristics by analysis of gamma rays from naturally ocurring formation radiation. The invention is particularly directed to techniques for the quantitative identification, measurement, and evaluation of the abundance of uranium (U) in uranium ore zones using such borehole radiation measurements.

In recent years gamma ray spectroscopy of earth formations in the vicinity of boreholes penetrating those formations has been made practical by the development of highly stable scintillation detectors which may be lowered into the boreholes and produce a pulse height spectrum proportional to the gamma ray energy spectrum of gamma rays impinging upon the scintillation crystal. As a result, a variety of borehole measurement techniques is now available for use in ore body evaluation. Current quantitative uranium ore identification and measurement techniques rely on either the detection of induced fission neutrons, integral measurements of gamma ray intensity, or analysis of gamma ray spectra to identify specific gamma rays from uranium or its daughters. All of these techniques have inherent limitations or drawbacks. The measurement of fission neutrons requires a pulsed neutron source and rather sophisticated electronic gear, and is affected by the neutron moderation and absorption properties of both the borehole and the medium containing the ore. The gross gamma count method and the spectral uranium identification method can be adversely affected by natural radioactive disequilibrium, and require accurate knowledge of probe efficiency, borehole size and fluid (and casing or cement, if present), tool position in the borehole, and dead time loss of the counting system in high concentration ore bodies.

There is therefore a need for an improved method and apparatus for quantitatively evaluating the abundance of uranium in ore zones in the vicinity of earth formations penetrated by a borehole. Such a method and apparatus should be virtually independent of the specific elements present in the borehole, be unaffected by the tool and borehole geometries, and not be strongly related to gamma ray energy.

SUMMARY OF THE INVENTION

Briefly, the present invention meets the above needs and purposes with a method and apparatus which quantitatively evaluate uranium ore zones by using the relative photoelectric absorption of uranium series gamma rays. In performing the invention, a scintillation type detector within a borehole logging instrument is lowered into an unknown borehole. The gamma ray energy spectrum detected by this scintillation detector is separated into two energy ranges or windows. (More windows may be used, and may prove helpful if another analysis is being concurrently performed on the data.) The counts in these windows, which represent the intensities of the natural gamma ray activity of the formation in these two gamma ray energy bands, are accumulated downhole and periodically transmitted to the surface. The results can be recorded on magnetic tape and visually output on the log, as well as being used in real time computer analysis for the uranium identification and measurement.

The first gamma ray energy band encompasses gamma rays at energies in an energy range from about 200 KeV to about 500 KeV, where photoelectric absorption in uranium is significant and photoelectric absorption from other downhole elements is not significant. The second gamma ray energy band encompasses gamma rays at energies in an energy range greater than about 800 KeV, where photoelectric absorption is not significant for any elements, including uranium.

The measurements are then combined by taking the ratio of the measurement in the second energy band to the measurement in the first energy band. This produces a uranium identifying ratio R(U) which gives a quantitative indication of the uranium concentration present.

The present invention is thus much less dependent on all of the above described parameters (probe efficiency, borehole size and fluid, casing, cement, tool position, counting system dead time, etc.). Advantageously, the invention can also be performed using the same type of gain stabilized spectral gamma probes which are used to make conventional borehole spectral measurements. Due to the effects described below, the invention should be especially well suited in high ore concentration zones.

The invention may best be understood by reference to the following detailed description thereof when taken in conjunction with the accompanying drawings in which:

DESCRIPTION OF THE PREFERRED EMBODIMENTS

Figure 1:
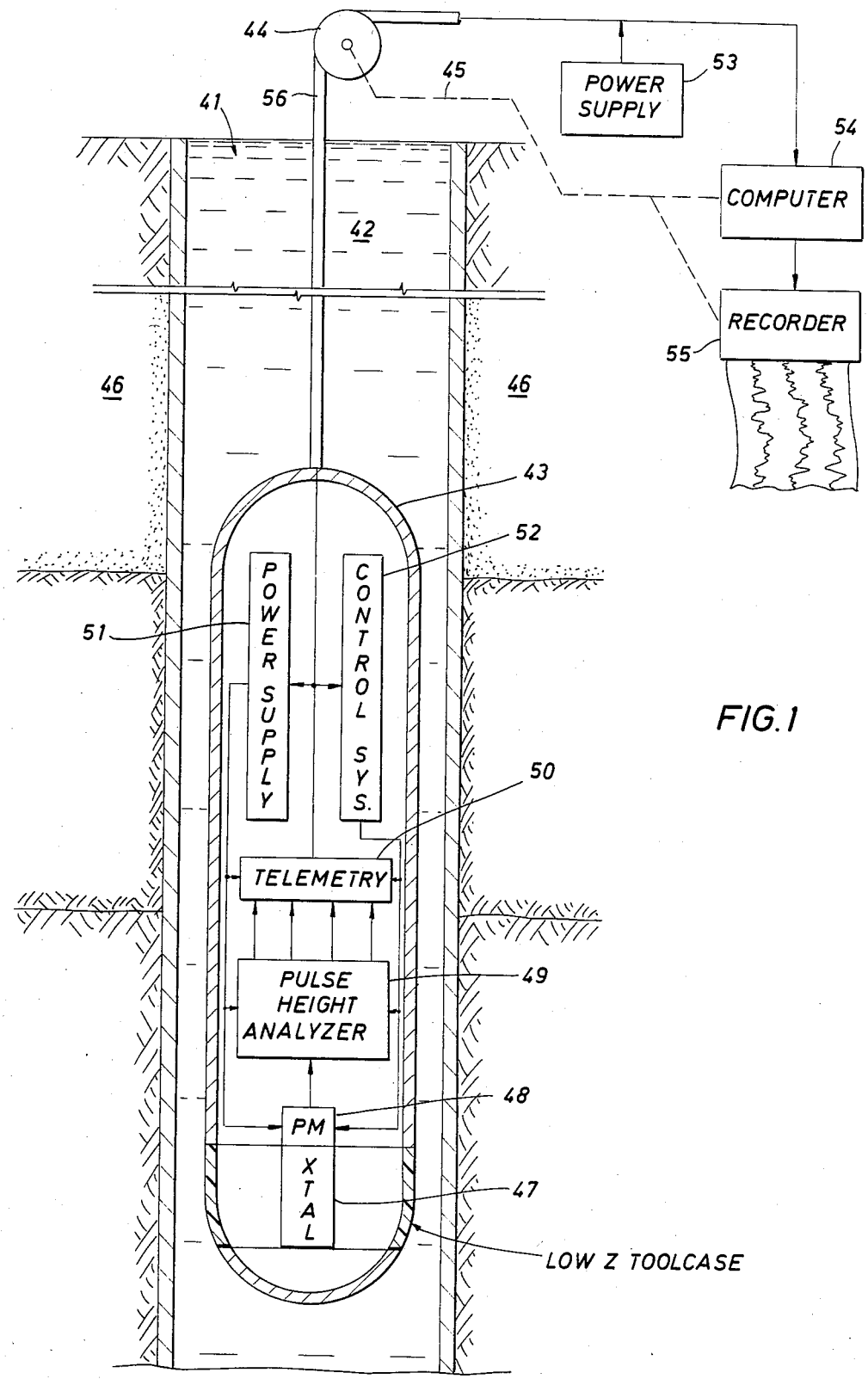
FIG. 1 is a schematic diagram of a well logging system employing the concepts of the present invention.

Natural gamma rays from uranium series elements in downhole formations (and most other naturally radioactive elements in earth formations as well) are emitted with energies $<3$ MeV. Attenuation of these gamma rays between their source in the rock formations and their being counted in a gamma ray detector in a logging probe is principally by Compton scattering. Compton scattering is dependent almost exclusively on the density of the materials through which the gamma rays pass. It is virtually independent of the specific elements present and is not strongly related to gamma ray energy.

At very low energies, another gamma ray attenuation process, photoelectric absorption, becomes significant. Unlike Compton scattering, however, photoelectric absorption (P.E.) is very strongly dependent on the specific elements present and on the energy of the gamma rays. Equation (1) below in general describes this dependence:

$$P.E. \sim \frac{Z^{4.6}}{E_\gamma^3} \quad (1)$$

where Z=the equivalent atomic number of the element(s) in the medium through which the gamma rays pass, and $E_\gamma$ is the energy of the gamma ray being attenuated.

For most downhole elements ($Z \leq 20$), as long as $E_\gamma$ is greater than about 100–125 KeV, photoelectric absorption is negligible. For iron, which has $Z=26$, the photoelectric absorption threshold is slightly higher (~175 KeV). Uranium, on the other hand, has $Z=92$, and as is evident from equation (1), will experience significant photoelectric absorption for gamma ray energies below ~500-600 KeV.

One way to observe this photoelectric absorption effect in uranium is to take a photoelectrically sensitive ratio of two energy ranges of detected count rates. One energy range in this ratio is chosen to encompass an interval where photoelectric absorption in uranium is significant but photoelectric absorption from other downhole elements is not (approximately greater than 200 KeV to approximately less than 500 KeV). The other energy range encompasses an interval where photoelectric absorption is not significant for any elements, including uranium ($E_\gamma$ approximately greater than 800 KeV).

An indication of the effectiveness of such a measurement can be seen in the ratios of gamma ray mass attenuation coefficients of various downhole elements at 300 KeV to those for each element at 1 MeV, as shown in Table I below.

TABLE I

| ELEMENT | M. Atten. CoEF (300 KeV) | M. Atten. CoEF (1 MeV) | Ratio |
|---|---|---|---|
| Aluminum (Al) | 0.104 cm²/gm | 0.0613 cm²/gm | 1.69 |
| Calcium (Ca) | 0.112 | 0.0639 | 1.75 |
| Carbon (C) | 0.107 | 0.0637 | 1.68 |
| Hydrogen (H) | 0.211 | 0.126 | 1.67 |
| Iron (Fe) | 0.110 | 0.0599 | 1.84 |
| Oxygen (O) | 0.107 | 0.0637 | 1.68 |
| Silicon (Si) | 0.108 | 0.0635 | 1.70 |
| Uranium (U) | 0.509 | 0.0776 | 6.56 |

From Table I it can be seen that uranium is easily discernable from all the other common downhole formation and borehole elements from a mass attenuation coefficient ratio, which is directly related to the photoelectric attenuation related ratio described above.

Referring now to FIG. 1, a well logging system in accordance with the concepts of the present invention is illustrated schematically. A well borehole 41 penetrates earth formations 46. Borehole 41 is shown lined with a steel casing to show that, with appropriately selected energy band measurements, the invention is usable in cased as well as open boreholes.

Figure 2:
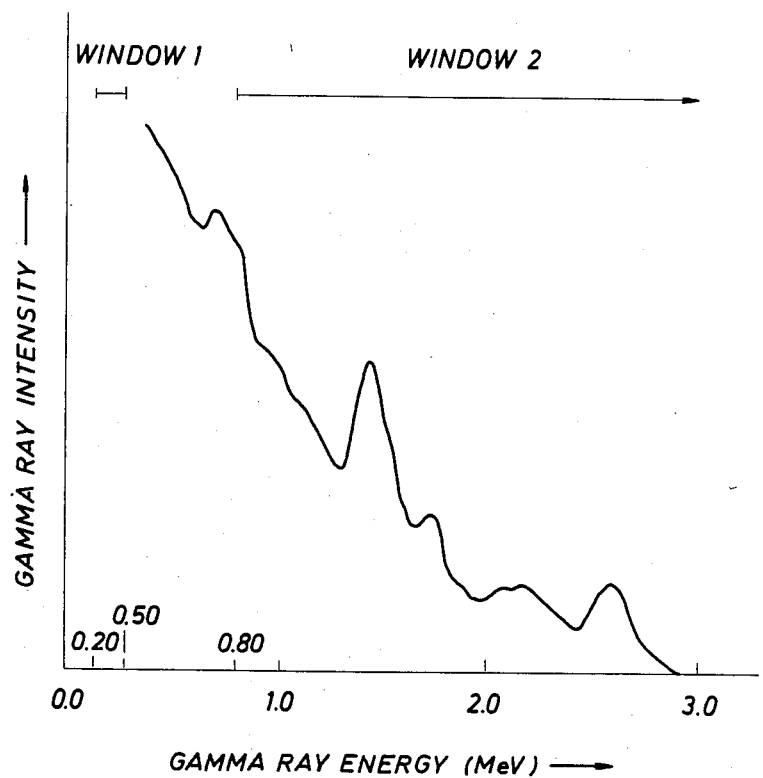
FIG. 2 is a graphical representation illustrating a typical natural gamma ray energy spectrum in a borehole taken with a scintillation detector and showing two approximate energy ranges or "windows" used in the present invention.

FIG. 2 illustrates schematically a natural gamma ray spectrum in which the gamma ray intensity or count rate is plotted as a function of gamma ray energy over the energy range from 0-3 MeV. Two energy windows contemplated for use according to the present invention are illustrated superimposed on the gamma ray spectrum of FIG. 1. The energy band or window labelled "WINDOW 1" generally encompasses an energy range from about 200 KeV to about 500 KeV. That labelled "WINDOW 2" includes energies generally greater than about 800 KeV. It should be recognized that it may be advantageous to select more than two windows to accomplish the measurements, but two windows are ordinarily sufficient.

The borehole 41 typically contains a wellbore fluid 42 to control pressure in subsurface formations, and as will be discussed below, such a fluid may cause slight spectral "softening" of the measured spectrum.

The measurements themselves are made by a downhole measurement probe or sonde 43 containing suitable instrumentation for measuring gamma ray spectral characteristics of the earth formations 46 which are penetrated by the borehole 41. The sonde 43 is suspended in the borehole 41 by an armored well logging cable 56 of the conventional type. Signals from the downhole sonde 43 are conducted to the surface on conductors of the cable 56 and supplied to a surface computer 54 which performs the appropriate signal processing to provide the count rates in the two energy windows selected. The uranium identifying ratio R(U) is then determined and recorded as a function of borehole depth on the recorder 55. It may also be possible using predetermined relationships between R(U) and uranium concentration (U) to output directly an indication of the latter.

The well logging cable 56 passes over a sheave wheel 44 which is electrically or mechanically coupled (as indicated by dotted line 45) to the computer 54 and recorder 55 in order to provide depth information about the downhole sonde 43 for the surface recording process. The surface computer 54 may be any of several known types suitable for performing these calculations (such as the model PDP-11 provided by Digital Equipment Corp. of Cambridge, Mass.). Preferably the computer will be programmable to perform the previously described computations and to drive the output displays.

The downhole sonde 43 contains near the lower end thereof a gamma ray detecting system comprising a scintillation crystal 47 (for example, a 2 in.×12 in. NaI(Tl) crystal) and a low noise photomultiplier and amplifier package 48. Power for the operation of the downhole sonde system is supplied from a surface power supply 53 via conductors of the cable 56 to a downhole power supply 51 where it is converted to appropriate voltage levels and supplied to the downhole circuitry components of the system as indicated in FIG. 1.

Gamma ray spectral signals are supplied from the photomultiplier tube 48 to a pulse height analyzer 49 where they are separated into count rates in the hereinbefore described energy windows. The pulse height analyzer provides multiple output signals, corresponding to the respective count rates in each of the energy windows, to a telemetry system 50 where the pulse height gamma ray spectral information is converted to an appropriate wave form for transmission to the surface via conductors of the well logging cable 56. Downhole control circuits 51 provide timing pulses to the pulse height analyzer and telemetry system in order to synchronize the transmission at regular data intervals from the downhole sonde 43 to the surface equipment. There synchronization signals are also encoded in the telemetry system 50 and supplied to the surface computer 54. A gain stabilization circuit may also be included in the system if desired.

Thus, naturally occurring gamma rays from the earth formations 46 are detected by the scintillation crystal 47-photomultiplier 48 detector system in the downhole sonde 43, broken down into their energy constituents by the pulse height analyzer 49, and telemetered to the surface by the telemetry system 50 on conductors of the armored well logging cable 56. At the surface, the signals are processed in accordance with the hereinbefore described techniques to evaluate and identify uranium ore zones in the earth formation 46 penetrated by the borehole 41, and to provide quantitative information regarding the concentration of uranium in these zones.

In the preferred embodiment the tool incorporates a toolcase composed of a low atomic number (Z) material. This configuration permits more sensitive measurements at low concentration levels, and reduces the skew which a heavier tool case might cause by attenuating the gamma ray energies. In very high temperature and pressure applications, or for cost effectiveness, a titanium or steel toolcase version of the tool may be used.

Figure 3:
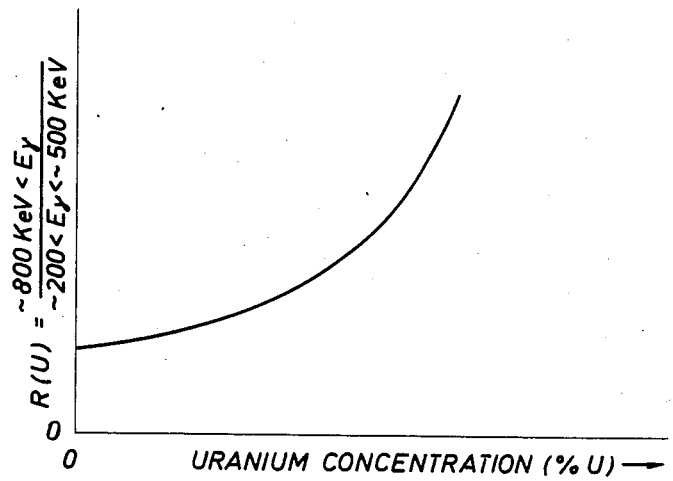
FIG. 3 is a graphical representation of the uranium concentration as a function of the uranium identifying ratio R(U) according to the present invention.

In an actual field uranium logging probe, one would define the uranium identifying ratio, R(U), as the observed counts ratio in the energy bands described above, with the gamma source being the natural activity of the formation. FIG. 3 depicts a hypothetical graph of U vs R(U). For empty, uncased boreholes, R(U) will increase monotonically as the uranium concentration of the formation increases. It may not necessarily be a linear function since uranium photoelectric attenuation is not a linear function of uranium concentration.

For low uranium concentrations there are two possible sources of interference to an unambiguous interpretation of R(U). If the borehole size changes or if the borehole contains water, mud, cement, or casing there will be an increase in Compton attenuation between the formation source and the gamma ray detector. This attenuation will primarily manifest itself in an overall reduction in observed count rate, independently of gamma ray energy— hence the need for "water factor" corrections and casing corrections in conventional uranium assay techniques. In the present invention, this effect would cause little or no change in the observed result since a ratio is used and the possibly detrimental effect therefore proportionally divides (cancels) out.

However, there is also a slight net Compton spectral softening (relative increase in lower energy gamma rays) when these attenuators are placed in the borehole, and hence a slight decrease in R(U) will be observed. This effect should be less significant for higher uranium concentrations. It should also generally be less significant than borehole interference on conventional uranium concentration determination techniques. Of course, as in conventional techniques, if borehole conditions are known, a correction can be applied to R(U).

The second source of possible interference at low uranium concentrations is due to the presence of other radioactive materials than uranium. Thorium series gamma rays are also commonly found in earth formations, usually in ppm concentrations. Since thorium series gamma rays have different energy spectra than those from the uranium series, the direct and Compton scattered count rates in the energy ranges constituting R(U) may be somewhat different. Also, thorium series elements have high Z values, similar to uranium, and will similarly cause photoelectric attenuation in the lower energy band of R(U). Therefore at low U concentrations, where relative thorium to uranium concentrations are significant, R(U) should be corrected for thorium effects. The thorium concentration can possibly be developed from simultaneous conventional "K-U-Th" spectral deconvolution processing, as is well known in the art.

Similar comments apply to the spectral distribution of potassium gamma rays from the formation. No photoelectric absorption interference from potassium will be observed, however, due to its low Z (=19).

Neither of these interference effects should be as significant at high uranium concentrations. Further, under certain circumstances it should also be possible to minimize the effects of these elements by judicious selection of the energy bands used in R(U), as long as they are within the general guidelines described above.

As may be seen, therefore, the present invention has numerous advantages. For example, when following conventional uranium gamma logging techniques, high ore concentrations produce count rates on the logs which can require very large "dead time" corrections prior to interpretation. The ratio technique described above according to the present invention is independent of dead time losses, since dead time losses in most systems affect absolute count rate, but not spectral shape. For the same reason, R(U) is independent of the absolute efficiency of the detector system used.

Since the equipment used to make the R(U) measurement is essentially the same as that required to make conventional natural gamma ray spectral (K-U-Th type) identification logs, the present invention lends itself nicely to possible combination with those techniques. The K-U-Th based measurement to obtain U, for example, could be used in intervals of low uranium concentrations, and the R(U) technique (possibly with K-U-Th based perturbation corrections for K and Th count rates) could be used in intervals of high uranium concentrations.

The foregoing description may make other alternative arrangements according to the concepts of the present invention apparant to those skilled in the art. The aim of the appended claims therefore is to cover all such changes and modifications as are truly within the scope of the invention.

What is claimed is:

1. A logging method for quantitatively evaluating the abundance of uranium in ore zones in the vicinity of earth formations penetrated by a borehole, comprising:
   (a) obtaining with a borehole measurement system measurements in the borehole of the natural gamma ray intensities in at least two energy bands of a gamma ray energy spectrum from the formation, the first energy band encompassing gamma rays at low energies from about 200 KeV to about 500 KeV where photoelectric absorption in uranium is significant and photoelectric absorption due to other expected downhole elements is not significant, and the second energy band encompassing gamma rays at higher energies greater than about 800 KeV where photoelectric absorption is not significant for any elements, including uranium, and
   (b) combining a function of the measurements in the two energy bands according to a predetermined relationship to derive a quantitative indication of the uranium concentration present and recording said quantitative indication as a function of borehole depth of the measurement system.

2. The method of claim 1 wherein said combining step includes taking a ratio of the measurements in the two energy bands.

3. A logging method for quantitatively evaluating the abundance of uranium in ore zones in the vicinity of earth formations penetrated by a borehole, comprising:

(a) obtaining with a borehole measurement system measurements in the borehole of the intensities of the natural gamma ray activity of the formation in at least two energy bands of a gamma ray energy spectrum, the first band encompassing gamma rays at energies in an energy range from substantially 200 KeV to substantially 500 KeV where photoelectric absorption in uranium is significant and photoelectric absorption from other downhole elements is not significant, and the second band encompassing gamma rays at energies in an energy range greater than substantially 800 KeV where photoelectric absorption is not significant for any elements, including uranium, and (b) forming a ratio of said measurements of intensities and comparing said ratio with a predetermined mathematical function to derive a quantitative indication of the uranium concentration present from said ratio of the measurements in the two energy bands and recording said quantitative indication as a function of the borehole depth of said measurement system.

* * * * *